March 22, 1955  E. D. DAHLMAN  2,704,605
SIDE DELIVERY SCREEN CONVEYOR STRUCTURE
Filed Aug. 14, 1950  2 Sheets-Sheet 1
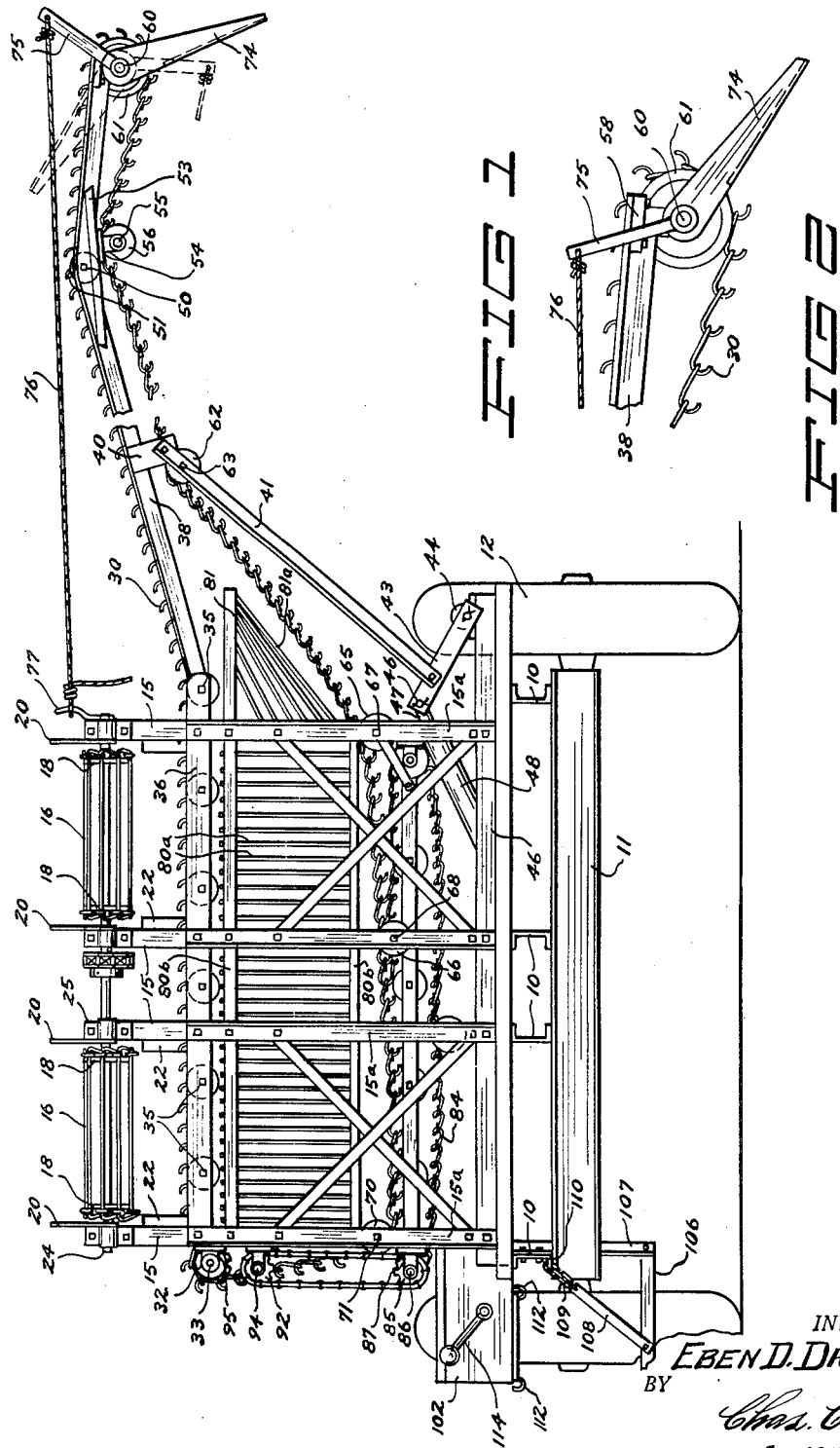
INVENTOR.
*Eben D. Dahlman*
BY
*Chas. C. Reif*
ATTORNEY.

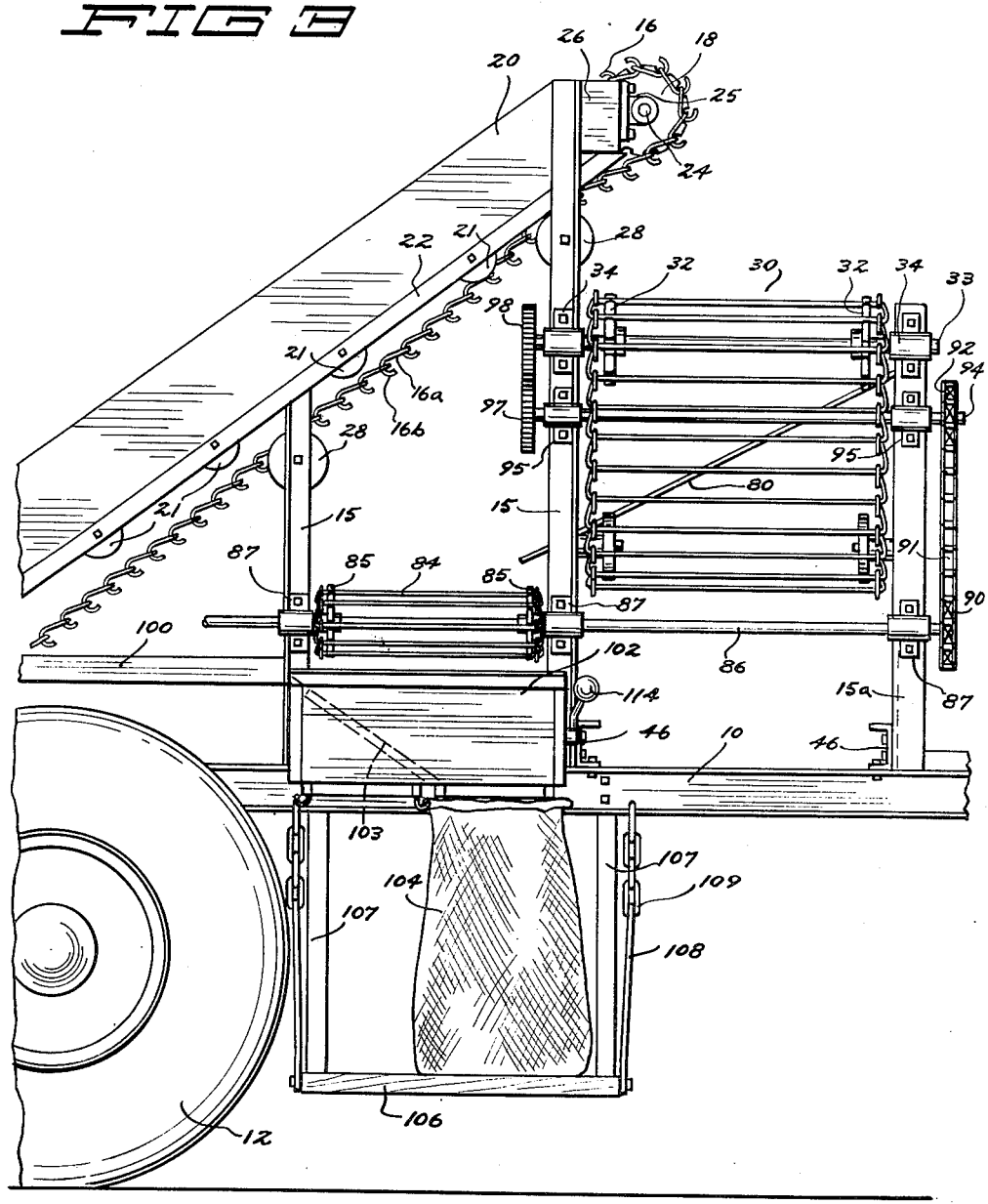

United States Patent Office 2,704,605
Patented Mar. 22, 1955

2,704,605

SIDE DELIVERY SCREEN CONVEYOR STRUCTURE

Eben D. Dahlman, Grandy, Minn., assignor to Dahlman Manufacturing Company, Braham, Minn., a corporation of Minnesota Application August 14, 1950, Serial No. 179,223

4 Claims. (Cl. 209—234)

This invention relates to a potato-handling machine and particularly to the type of potato-handling machine known as a potato picker. Such a potato picker usually has a conveyor on which the potatoes are moved, with means adjacent the conveyor for supporting operators who can pick vines and other foreign matter from the potatoes on said conveyor. It frequently is desirable to discharge the potatoes to a vehicle at some distance from the potato picker.

It is an object of this invention therefore to provide a potato picker having one or more upwardly inclined conveyors on which the potatoes are moved upwardly together with a second conveyor extending laterally of or substantially at right angles to said picking conveyors and extending quite a long distance at one side of the picker for discharging the potatoes into a wagon or other receptacle, and means for swinging said second conveyor vertically, said second conveyor preferably having means which may take the form of a scoop-like chute at its end onto which the potatoes drop for retarding the falling movement of said potatoes as they leave said second conveyor.

It is another object of the invention to provide such a structure as set forth in the preceding paragraph, together with a screen beneath said second conveyor adjacent the picker, which screen inclines downwardly and laterally of said second conveyor, together with a third conveyor for receiving potatoes delivered from said screen.

It is still further an object of the invention to provide means for receiving and bagging the potatoes delivered from said third conveyor.

These and other objects and advantages of the invention will be fully set forth in the following description made in connection with the accompanying drawings in which like reference characters refer to similar parts throughout the several views and in which:

Fig. 1 is a view in rear elevation of the picker and conveyor structure;

Fig. 2 is a partial view similar to Fig. 1 showing a chute construction; and

Fig. 3 is a view in side elevation of the device.

Referring to the drawings, a machine is shown having a frame comprising longitudinally extending spaced members 10 illustrated as in the form of channels, the outermost ones of said channels having their flanges directed outwardly and another pair of said channels having their flanges directed inwardly. Transverse channels 11 are supported below the channels 10 and carry axles on which the rear wheels 12 of a potato picker are journaled. Said frame also comprises vertical extending members 15 which support the upwardly moving picking conveyors 16. The conveyors 16 comprise endless members formed of link rods 16a having their ends bent at right angles and formed with hook portions 16b which engage the adjacent members 16a. Member 16 runs over sprockets 18 at each end, one pair of which is shown. As shown in Fig. 1, the machine comprises a pair of the members 16 and said members move between side plates or boards 20 respectively. The upper run of member 16 is supported upon a plurality of rollers 21 journaled on shafts secured in bars 22 extending along the sides of the plate 20. Sprockets 18 are journaled upon shafts 24 carried in bearings 25 secured to blocks 26 in turn secured to certain of the vertical members 15. The lower runs of the conveyors 16 respectively are supported upon rollers 28 journaled on shafts supported in the upright members 15.

In accordance with the present invention a second conveyor is provided comprising an endless member 30 formed of link rods similar to the rods 16a and said conveyor is supported on one of the uprights 15 and upon another upright member 15a secured to the channels 10. Member 30 runs over sprockets 32 at one end which are secured to a shaft 33 journaled in bearings 34 secured by suitable bolts to the upright members 15 and 15a. From sprockets 32, as shown in Fig. 1, the upper run of member 30 extends substantially horizontally, the same being supported upon a plurality of spaced rollers 35 carried on shafts journaled in bars 36 extending at each side of member 30 and supported upon the uprights 15 and 15a. At the side of the frame and one of the side uprights 15 and 15a a pair of spaced bars 38 are shown having their inner ends secured to the bars 36 respectively and supported some distance from members 15 by the brackets 40 to which are secured the supporting and brace bars 41 which extend down to levers 43 which are pivotally secured to brackets 44 in turn secured to a bar 45 extending transversely of the frame and supported on the channels 10. One end of levers 43 is connected by a rod 46 to which is connected one end of a plunger 47 of a hydraulic cylinder 48 to which fluid will be supplied in a manner well known in the art. Members 38 are swingable about ons of the shafts 35 and it will be seen that said members 38 and member 30 can be swung about the axis of said shaft 35 by levers 43 actuated by the hydraulic hoist having a cylinder 48. The bars 38 are formed with an obtuse angle adjacent their outer end and a shaft 50 is secured in and extends between said bars substantially at the apex of said angle, the same having a roller 51 journaled thereon supporting the top run of member 30. Bars 53 are secured to the bars 38 and support depending brackets 54 in which is disposed a shaft 55 carrying a roller 56 which supports the lower run of member 30. The bars 38 at their outer ends carry bearings 58 in which are journaled shafts 60 having secured thereto sprockets 61 over which the outer end of member 30 passes. The lower run of member 30 is also supported upon a roller 62 journaled on a shaft 63 secured in and extending between the bars 41. The lower run of member 30 is also supported upon rollers 65 and 66 journaled upon shafts 67 and 68 secured in the uprights 15 and 15a. After passing over roller 66 the lower run of member 30 passes around a roller 70 journaled on a shaft 71 secured in the uprights 15 and 15a, and said lower run then passes upwardly to sprockets 32. A scoop-like chute 74 is mounted for swinging movement about the axis of shaft 60 and extends across the outer end of member 30. Said chute has an arm 75 secured thereto adjacent the outer end of which is secured a cable 76, the other end of which is adapted to be fastened about a hook 77 secured to the upright 15.

Disposed beneath the conveyor 30 within the sides of the frame is a screen 80. While this screen could be variously formed, in the embodiment of the invention illustrated it is shown as formed of spaced rods 80a secured at their ends in transversely extending bars 80b which are secured respectively to uprights 15 and 15a. Said screen also has a portion 81 which projects at one side of the frame and has rods 81a similar to the rods 80a extending downwardly and laterally of conveyor 30. The screen 80 extends over and is disposed to deliver to a conveyor 84 also formed of link rods, as shown, in conveyors 16 and 30. Conveyor 84 is an endless conveyor and at one end passes over sprockets 85 secured to a shaft 86 supported in bearings 87 secured to the uprights 15 and 15a. Shaft 86 extends to one side of the upright 15a and has secured thereto a sprocket 90 over which runs a chain 91 also running over a sprocket 92 secured to one end of a shaft 94 journaled in bearings 95 secured to one side of the bars 15 and 15a. Shaft 94 carries at its other end a gear 97 which meshes with a gear 98 secured to the shaft 33. Shaft 86 will be suitably driven from a motor which is mounted on the picker.

A platform 100 extends along the side of the picking conveyor 16 and extends to the uprights 15a at one end of the conveyor 30. The conveyor 84 delivers to a chute 102 which has swinging guides 103 therein adapted to direct potatoes to one side or the other of said chute and into a bag 104 which will be supported upon a platform 106. Platform 106 is supported by vertical bars 107 secured at their upper ends to the members 10. Said platform is also secured by the bars 108 secured adjacent its outer end at the sides thereof which are connected to the chains 109 which will be engaged in a portion of channel members 110 secured to members 107. The bag 104 will be supported at its upper end upon hooks 112 secured to the bottom of chute 102. When one bag 104 is filled, another bag will be placed at the other side of the platform 106 and member 103 will then be moved by a handle 114 to direct the potatoes into the second bag while bag 104 is being tied and removed.

In operation the picker is progressed along the rows of potatoes and the potatoes are successively moved by conveyors, as shown in applicant's pending application, S. N. 77,401, and filed February 19, 1949. The potatoes finally move onto the picking conveyor 16 and are moved upwardly to the top thereof. The operators can stand upon the platforms 100 which are disposed at the outer sides of the conveyor 16 and pick out any foreign matter which has not yet been removed. The conveyors 16 discharge at their tops on the transversely extending conveyor 30. This conveyor will have the link rods thereof spaced from 1½ inches to 1¾ inches apart. When the potatoes are delivered from the conveyors 16 onto conveyor 30 quite a number of the smaller potatoes will pass through the upper run of conveyor 30 in the zone of screen 80. These potatoes will be directed by the screen 80 onto the conveyor 84 and will be moved by conveyor 84 into the chute 102 from which they will be delivered to the bags 104. The rods of screen 80 will be quite close together so that any potatoes passing therethrough will be discarded and not saved. The larger potatoes continue on conveyor 30 and will be discharged over the outer end thereof into a vehicle such as a wagon, which will move along with the picker. The conveyor 30 can be swung about the axis of the shaft 35 to bring it to the desired height at its outer end. The wagons receiving the potatoes may be quite deep and it will be desirable to have the conveyor at a lower point when the potatoes are first delivered thereto. The chute 74 is provided mainly to retard the fall of the potatoes as they drop into the wagon so that they will not be unduly bruised. The sides of the chute also direct the potatoes properly into the wagon. The angle of the chute can be varied by pulling upon the cable 76 and securing it at different points to the member or bracket 77. When not in use the chute 74 can be swung over on top of conveyor 30. The shaft 86 will be suitably driven from the motor which is mounted on the frame of the picker so that conveyors 30 and 84 will be properly driven.

From the above description it will be seen that I have provided a comparatively simple and highly efficient structure for handling the potatoes and delivering them from the picker. The larger or first grade potatoes are delivered to the wagons or other receptacles while the smaller potatoes are delivered through chute 102 and can be suitably bagged. The platform 106 is large enough to support operators handling the bags 104. The machine has been amply demonstrated in actual practice, found to be very successful and efficient and is being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A potato-handling machine having in combination, an endless picking conveyor for moving potatoes upwardly, a second endless conveyor disposed substantially at right angles to said picking conveyor, a portion of said second conveyor extending laterally for a substantial distance of said picking conveyor in said machine, said laterally extending portion of said second conveyor being pivotally mounted to be movable upwardly and downwardly, a link having its upper end secured to said extended portion of said second conveyor, a hydraulic plunger secured to said machine, a lever having one end secured to said plunger and its other end secured to a stationary portion of said machine, said link having one end secured to said lever intermediate its ends whereby said plunger can move said extended portion of said second conveyor upwardly and downwardly.

2. The structure set forth in claim 1, and a rigid one-way chute swingingly secured about a pivot at its upper end to the outer end of said second conveyor, an arm extending substantially radially of said pivot secured to said chute and a flexible member secured to said arm for moving said chute to various positions about said pivot, said chute being a one-way chute for receiving potatoes from said second conveyor and movable to said positions for diminishing the fall of the potatoes into a wagon as said second conveyor is raised or lowered to prevent bruising of said potatoes.

3. A potato-handling machine having in combination, a pair of substantially parallel endless picking conveyors inclined upwardly for moving potatoes, a second endless conveyor disposed at right angles to said picking conveyors in position for receiving potatoes therefrom, said second conveyor having a portion extending laterally of said picking conveyors and of said machine in an upward direction for quite a distance, the outer end portion of said laterally extending portion of said second conveyor being inclined downwardly, said laterally extending portion of said conveyor being movable upwardly and downwardly, a link having its upper end pivotally secured to said laterally extending portion, a hydraulic means secured to said machine including a movable plunger, a lever having one end secured to said plunger and its other end secured to said machine, the lower end of said link being secured to said lever.

4. A potato-handling machine having in combination, a pair of substantially parallel endless picking conveyors inclined upwardly for moving potatoes, a second endless conveyor disposed at right angles to said picking conveyors in position for receiving potatoes therefrom, said second conveyor having a portion extending laterally of said picking conveyors and of said machine for quite a distance, said laterally extending portion of said conveyor being movable upwardly and downwardly, said second conveyor being composed of spaced transversely extending means through which smaller potatoes may pass, an inclined screen of parallel rods disposed in said machine intermediate the top and bottom runs of said second conveyor and extending longitudinally of, along and substantially parallel to said second conveyor, a third conveyor disposed along said screen whereby said potatoes passing through said second conveyor are deflected by said screen and pass onto said third conveyor, the very small potatoes falling between said rods of said screen.

References Cited in the file of this patent

UNITED STATES PATENTS

| Number | Name | Date |
|---|---|---|
| 161,011 | Davis | Mar. 23, 1875 |
| 905,921 | Pugh | Dec. 8, 1908 |
| 1,425,791 | Oak | Aug. 15, 1922 |
| 1,440,232 | Muir | Dec. 26, 1922 |
| 1,467,392 | Mowry | Sept. 11, 1923 |
| 1,715,218 | Wright et al. | May 28, 1929 |
| 1,749,205 | Allen et al. | Mar. 4, 1930 |
| 1,874,096 | Ghent | Aug. 30, 1932 |
| 1,953,317 | Stoltenberg | Apr. 3, 1934 |
| 2,027,840 | Rodin | Jan. 14, 1936 |
| 2,093,920 | McCoy | Sept. 21, 1937 |
| 2,365,077 | Hertzler et al. | Dec. 12, 1944 |
| 2,501,448 | Lockwood | Mar. 21, 1950 |
| 2,559,965 | Innes | July 10, 1951 |